United States Patent
Knowles et al.

[15] 3,677,487
[45] July 18, 1972

[54] APPARATUS FOR STORING STRIP MATERIAL

[72] Inventors: Frederick G. Knowles, Rochester; Clarence R. Taylor, Penfield, both of N.Y.

[73] Assignee: Eastman Kodak Company, Rochester, N.Y.

[22] Filed: Feb. 3, 1970

[21] Appl. No.: 8,267

[52] U.S. Cl. ..........................242/71.2, 206/52 F, 242/74.2
[51] Int. Cl. .....................................G03b 1/04, G03b 23/04
[58] Field of Search ............... 242/71.2, 71.1, 74.2, 197, 242/71; 206/52 F, 159 E

[56] References Cited

UNITED STATES PATENTS

| | | | |
|---|---|---|---|
| 3,288,390 | 11/1966 | Kato | 242/71.2 |
| 3,398,912 | 8/1968 | Weggeland | 242/71.2 |
| 2,218,966 | 10/1940 | Zapp | 242/71.2 |
| 2,051,206 | 8/1936 | Fairbanks | 242/71.2 |
| 1,553,896 | 9/1925 | Gauriat | 242/74.2 X |
| 2,161,341 | 6/1939 | Fairbanks | 242/71.2 |
| 3,138,084 | 6/1964 | Harvey | 206/52 F X |

*Primary Examiner*—George F. Mautz
*Assistant Examiner*—Milton Gerstein
*Attorney*—R. W. Hampton and R. Lewis Gable

[57] ABSTRACT

Strip storage apparatus is disclosed for use in a film viewer, which includes two storage chambers and is open on one end to allow rapid insertion of two film take-up members on shafts disposed in the chambers. In one aspect of the invention, the take-up members have a slot therein and are rotatably held in the storage apparatus and rotatably coupled to the shaft by means of a fastening member inserted in the slot of each take-up member. In a second aspect of this invention, the take-up member includes a flange or cover portion for closing the chamber when the take-up member is disposed therein. A keyway on the end of each take-up member may be engaged by suitable drive means in the viewer to selectively rotate one of the take-up members.

4 Claims, 10 Drawing Figures

Patented July 18, 1972

FREDERICK G. KNOWLES
CLARENCE R. TAYLOR
INVENTORS

ATTORNEYS

FREDERICK G. KNOWLES
CLARENCE R. TAYLOR
INVENTORS

ATTORNEYS

APPARATUS FOR STORING STRIP MATERIAL

CROSS-REFERENCE TO RELATED APPLICATION

Reference is made to commonly assigned co-pending U.S. application Ser. No. 8,309, entitled SELECTIVE SCANNING CONTROL FOR PROJECTION APPARATUS, filed Feb. 3, 1970, in the names of Frederick Knowles and Clarence Taylor; and to commonly assigned co-pending U.S. application Ser. No. 8,266, entitled Cassette Tape Microfilm Reader, filed Feb. 3, 1970 in the names of Frederick Knowles and Clarence Taylor.

BACKGROUND OF THE INVENTION

1. Field of the Invention

This invention relates to the projection of images carried on an information bearing medium and apparatus for use in storing that medium. Apparatus for such projection is described in applicants' co-pending U.S. applications Ser. No. 8,309 and Ser. No. 8,266. More particularly, the invention relates to storage apparatus commonly called cassettes for use in a small, compact microfilm viewer. While the following description of the invention is of a cassette adapted for use in apparatus as described in the co-pending application, it is understood that the cassette is not limited to such use but may be adapted for use in apparatus having different purposes and features.

2. Description of the Prior Art

There are many viewers available for reading microfilm images but most are large and bulky. In addition, there are many forms of information bearing media available but they are normally designed for use with elaborate handling devices. It is a principal object of the present invention to simplify the storage and handling of information frames or images stored on information bearing media in the form of a filmstrip.

Another object of the invention is to facilitate the loading and unloading of the filmstrip in the cassette.

A further object of the invention is to permit the easy loading of a cassette into a portable viewer and to provide in cooperation with such a viewer a convenient means for scanning a set of images stored on a filmstrip.

SUMMARY OF THE INVENTION

Briefly, the invention comprises a cassette or storage apparatus which has two film storage cavities, connected by a film passageway therebetween. In one embodiment, the storage cavities are open on one end to allow the insertion of take-up members on shafts contained within each storage cavity, the take-up members being secured by suitable fastening means to the shafts within the storage cavities in one embodiment. In a second embodiment, the take-up members include a flange or cover portion to position the take-up member within and to enclose the storage cavity.

The invention, and its objects and advantages, will become more apparent in the detailed description of the preferred embodiments of the invention presented below.

BRIEF DESCRIPTION OF THE DRAWINGS

In the detailed description of the preferred embodiments presented below, reference is made to the accompanying drawings in which.

DESCRIPTION OF THE PREFERRED EMBODIMENTS

Figure 1:
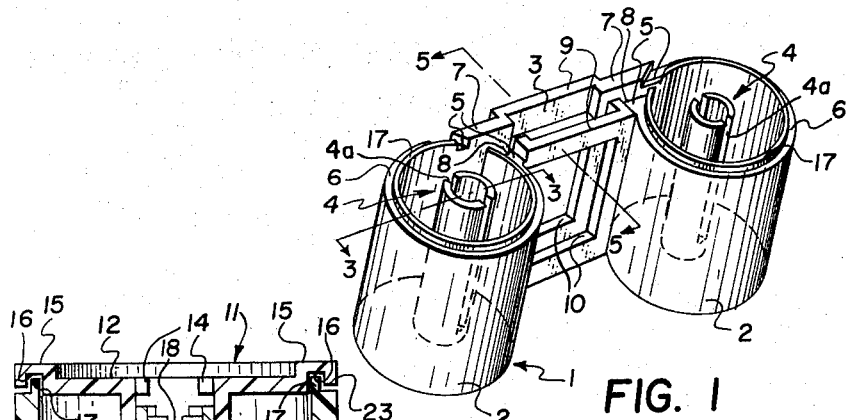
FIG. 1 is a perspective view of an unloaded cassette according to a preferred embodiment of the invention.

Referring now to the drawings and in particular to FIG. 1, a film cassette 1 comprises two shells or storage cavities 2 and a film passageway 3 disposed therebetween. The cavity 2 and passageway 3 are open on one end. Contained within each storage cavity 2 is a shaft 4 having a slot 4a along at least part of its length. Recess 5 and retaining flange 17 are formed in a rim 6 at the open end of each cavity 2, whose purposes will be explained later. Passageway 3 is formed by two walls 7 and 8, wall 7 being disposed tangential to the outer surface of cavities 2 and wall 8 being spaced substantially parallel from the wall 7. Walls 9 are formed in the middle of walls 7 and 8 between cavities 2 and are spaced from each other a greater distance than walls 7 and 8. Each wall 9 has a window 10, which in conjunction with passageway 3 acts to frame for projection the microfilm image carried by a film strip 19.

Figure 2:
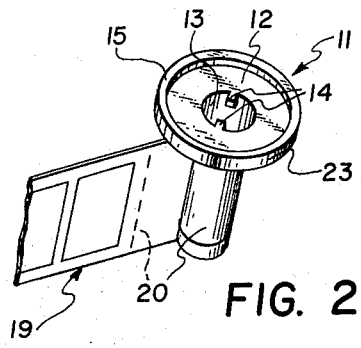
FIG. 2 is a perspective view of a take-up member and the image bearing filmstrip, for use in the cassette of FIG. 1.
Figure 3:
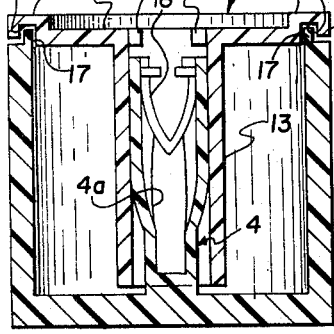
FIG. 3 is a sectional view of a loaded cassette taken along the line 3—3 of FIG. 1.
Figure 4A:
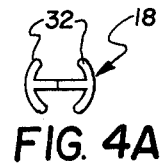
FIGS. 4A and 4B are respectively top and side views of a resilient fastener for securing together the take-up member shown in FIG. 2 and the cassette shown in FIG. 1.
Figure 4B:
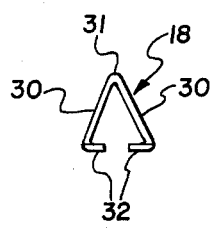

As shown in FIG. 2, a take-up member 11 to be inserted within the cavities 2 includes a flange 12 disposed at only one end thereof and a central core 13 containing ridges 14 extending along the length of the take-up member 11. The periphery of the lower edge of flange 12 is formed as shown in cross-section in FIG. 3 with a raised portion 15 in which is formed a groove 16 and a lip 23. In operation, the take-up member 11 is loaded into each cavity 2 of cassette 1 by inserting the shaft 4 into the central core 13. The retaining flange 17 on each cavity 2 fits into the groove 16 on flange 12 as may best be seen in FIG. 3. The recess 5 is adapted to receive the lip 23 of flange 12 as the take-up member 11 rotates. As seen in FIGS. 4A and B, resilient means for fastening such as fastener 18 is formed with two arms 30 extending from a point 31 of intersection. Fingers 32 are formed at the opposite ends of the arms 30 from the point 31 of intersection and are generally of the same curvature as the interior surface of shaft 4. In operation, the fastener 18 is inserted into the shaft 4 after the take-up member 11 has been placed over the shaft 4 so that the point 31 of intersection faces downward as shown in FIG. 3. Arms 30 of the fastener 18 are urged inwardly from their normal position as the resilient fastener 18 is inserted into the shaft 4 to thereby exert an outward force on the shaft 4 causing the slot 4a in the shaft 4 to widen. Thus, the shaft 4 is opened sufficiently to contact the inner surface of the core 13 as shown in FIG. 3. However, the frictional force developed between the shaft 4 and the core 13 while sufficient to hold the take-up member 11 in the cassette 1, is not sufficient to prevent rotation of the take-up member 11.

Figure 6:
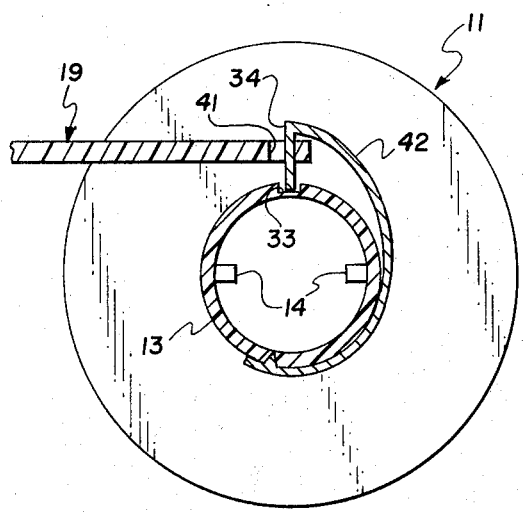
FIGS. 6 and 7 are two views of a take-up member showing one means of attaching a filmstrip thereto.
Figure 7:
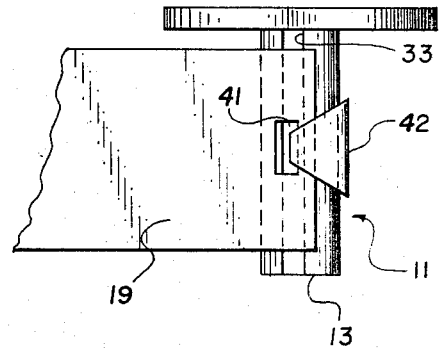

The filmstrip 19 may be attached to the take-up member 11 in a manner which is best seen in FIGS. 6 and 7 or any other well known manner, such as by tape 20 as in FIG. 1. In FIGS. 6 and 7, the filmstrip 19 contains a notched hole 41 at both ends. The take-up member 11 is formed with a spring clip 42 which extends partway around the periphery of the take-up member 11. A groove 33 is formed at least partway along the length of the take-up member 11 and is deposited to receive a detent finger 34 formed upon the end of the spring clip 42. As the filmstrip 19 is slid into position on the take-up member 11, hole 41 is positioned directly under the finger 34 and the spring clip 42 urges the finger 34 through the hole 41 and into the groove 33. After attachment to the two take-up members 11, the take-up members 11 are placed in the cavities 2 of cassette 1 and the filmstrip 19 is passed through the passageway 3 of cassette 1.

Figure 5:
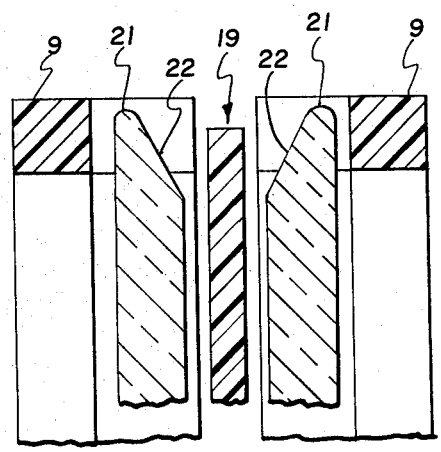
FIG. 5 is a partial sectional view of a loaded cassette in position within a viewer as taken along the line 5—5 of FIG. 1.

When the cassette 1 is loaded into a film viewer such as that disclosed in applicants' aforesaid co-pending applications, the viewer and cassette 1 cooperate to permit scanning and viewing of the microfilm images contained on the filmstrip 19. In particular, such a viewer may include a pair of transparent flats 21, as shown in FIG. 5, to be inserted into passageway 3 between walls 9 when the cassette 1 is loaded into the viewer. Each flat 21 has a tapered upper end 22, the ends 22 being tapered inwardly. This taper facilitates the insertion of filmstrip 19 between the flats 21 by directing the filmstrip 19 inwardly into the gap between the flats 21. The filmstrip 19 is then centered in the passageway 3 and the images contained thereon may be projected.

A drive shaft in the viewer (not shown) is adapted to engage the ridges 14 of each take-up member 11 when the cassette 1 is loaded into the viewer. Rotation of the drive shaft may be controlled in any known manner, and rotation of the drive shaft fitted in one take-up member 11 will allow the filmstrip 19 to be advanced onto that take-up member 11. Rotation of the drive shaft fitted into the other take-up member 11 will allow the film direction to be reversed and the filmstrip 19 to be rewound. Recesses 5 in cavities 2 allow free rotation of each take-up member 11 as lip 23 of flange 12 passes through the recesses 5 as the take-up member 11 is rotated.

Figure 8:
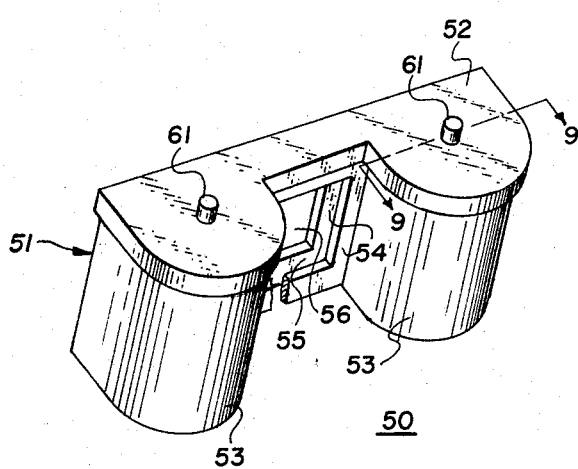
FIG. 8 is a perspective view of a cassette according to another embodiment of this invention.
Figure 9:
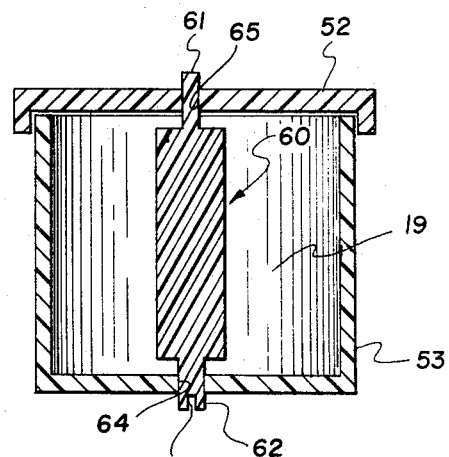
FIG. 9 is a cross-section of the cassette shown in FIG. 8 taken along the line 9—9 of FIG. 8, after loading with a take-up member.

Referring now to FIGS. 8 and 9, wherein an alternate embodiment of this invention is shown, a cassette 50 comprises a body 51 and a cover 52. The body 51 includes two film storage cavities 53 and a pair of walls 54 for forming a film passageway 55 between the cavities 53. Windows 56 are formed in walls 54 to frame the microfilm images for projection.

A spool 60 is formed with spindles 61 and 62 carried by a filmstrip extending from the ends thereof. The spindle 62 has a keyway 63 cut across the diameter thereof. In operation two spools 60 with a filmstrip 19 secured therebetween are loaded into the cassette 50 by inserting spindle 62 into holes 64 in the bottom of the cavities 53. The filmstrip 19 is passed through the passageway 55 between the cavities 53. The cover 52 is then aligned with the body 51 and pressed into place as the spindles 61 are inserted through the holes 65 in the cover 52. The cover 52 fits tightly over the body 51 so as to hold the spools 60 inside the cassette 50 but not so tightly so as to prevent rotation of the spools 60 within the cassette 50. The cassette 50 may then be loaded into a film viewer, such as that disclosed in applicants' copending applications. The keyway 63 would be engaged by a suitable drive shaft in the viewer to rotate the spool 60 and to permit movement of the filmstrip 19 in either a forward or reverse direction.

The invention has been described in detail with particular reference to a preferred embodiment thereof; but it will be understood that variations and modifications can be effected within the spirit and scope of the invention.

We claim:

1. Apparatus for removably storing a strip of an information-bearing medium, said apparatus comprising, first and second take-up members for winding the strip thereabout and therebetween, a cassette open at one end thereof including first and second storage cavities accessible through said opening for receiving said first and second take-up members respectively, and means for providing a passageway for the strip, said passageway connecting said first and second storage cavities, said cassette having a shaft contained in each of said first and second storage cavities, and fastening means for rotatably coupling said first and second take-up members respectively to said shafts.

2. The apparatus according to claim 1 wherein each of said shafts is bifurcated to form a transverse slot extending at least part way along the length thereof to permit the expansion of said shafts, and wherein said fastening means cooperates with said slots to rotatably couple said first and second take-up members respectively to said shafts.

3. The apparatus according to claim 2 wherein said fastening means comprises a resilient fastener insertable in said shaft slots.

4. The apparatus according to claim 1 wherein said first and second take-up members each comprise:

a. a flange at one end thereof having a central opening; and
   b. a centrally bored cylinder attached to each of said flanges so that said flange opening and cylinder bore are in registration, the inner diameter of said cylinder being slightly larger than the outer diameter of said shafts to facilitate insertion of each of said shafts into each of said cylinders when said take-up members are received respectively in said first and second storage cavities, said fastening means being insertable into said shaft slots via said flange openings.

* * * * *